United States Patent
Lim et al.

(10) Patent No.: US 9,445,342 B2
(45) Date of Patent: Sep. 13, 2016

(54) METHOD AND DEVICE FOR CONTROLLING HANDOVER OF USER EQUIPMENT IN LONG CONNECTED MODE IN WIRELESS COMMUNICATION SYSTEM

(71) Applicant: Samsung Electronics Co., Ltd., Suwon-si, Gyeonggi-do (KR)

(72) Inventors: Han Na Lim, Seoul (KR); Sang Soo Jeong, Suwon-si (KR); Song Yean Cho, Seoul (KR); Jung Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/413,317

(22) PCT Filed: Jul. 10, 2013

(86) PCT No.: PCT/KR2013/006135
§ 371 (c)(1),
(2) Date: Jan. 7, 2015

(87) PCT Pub. No.: WO2014/010937
PCT Pub. Date: Jan. 16, 2014

(65) Prior Publication Data
US 2015/0208315 A1    Jul. 23, 2015

(30) Foreign Application Priority Data

Jul. 10, 2012    (KR) ........................ 10-2012-0075215

(51) Int. Cl.
*H04W 36/30* (2009.01)
*H04W 36/38* (2009.01)
*H04W 36/00* (2009.01)
*H04W 88/02* (2009.01)
*H04W 88/08* (2009.01)

(52) U.S. Cl.
CPC ......... *H04W 36/38* (2013.01); *H04W 36/0055* (2013.01); *H04W 36/0088* (2013.01); *H04W 36/30* (2013.01); *H04W 88/02* (2013.01); *H04W 88/08* (2013.01)

(58) Field of Classification Search
CPC ........... H04W 36/38; H04W 36/0083; H04W 36/0088; H04W 72/042; H04W 76/00; H04W 76/04; H04W 76/06; H04W 24/10; H04W 24/00; H04W 24/02
USPC ......................................................... 455/438
See application file for complete search history.

(56) References Cited

U.S. PATENT DOCUMENTS

2008/0090573 A1* 4/2008 Kim ...................... H04W 36/08
                                                            455/436
2012/0307669 A1* 12/2012 Kim ...................... H04W 24/10
                                                            370/252

FOREIGN PATENT DOCUMENTS

| KR | 10-2010-0092742 A | 8/2010 |
| KR | 10-2011-0088005 A | 8/2011 |
| KR | 10-2012-0034159 A | 4/2012 |
| KR | 10-2012-0047943 A | 5/2012 |

* cited by examiner

*Primary Examiner* — Siu Lee
(74) *Attorney, Agent, or Firm* — Jefferson IP Law, LLP

(57) ABSTRACT

The present invention relates to a method and a device for effectively controlling a handover of a user equipment (UE) in a long connected mode. A method for controlling a handover by an eNB, according to one embodiment of the present invention, comprises the steps of: checking whether a UE is in a long connected mode; and transmitting, to the UE, channel measurement configuration information of which a channel measurement report trigger condition is alleviated compared with a normal connected mode.

14 Claims, 7 Drawing Sheets

METHOD AND DEVICE FOR CONTROLLING HANDOVER OF USER EQUIPMENT IN LONG CONNECTED MODE IN WIRELESS COMMUNICATION SYSTEM

TECHNICAL FIELD

The present invention relates to a wireless communication system. In more particular, the present invention relates to a method and apparatus for controlling handover of a User Equipment (UE) in long connected mode in a wireless communication system.

BACKGROUND ART

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

As one of the next-generation mobile communication systems to meet such requirements, standardization for a Long Term Evolution-Advanced (LTE-A) system is underway in the $3^{rd}$ Generation Partnership Project (3GPP). LTE-A is a technology designed to provide high speed packet-based communication of up to 1 Gbps.

In such a wireless communication system, the UE in the connected mode is allocated radio resource for data communication and, when the data communication is complete, releases the radio resource to enter the idle mode. The UE in the idle mode performs signaling to be allocated radio resource for data communication again.

Meanwhile, with the popularization of smartphone, it occurs frequently that multiple applications are running simultaneously. This causes the UE to generate small data such as keepalive and state transition messages frequently.

In this case, the UE also has to transmit signals to request for allocation and release of the radio resource and core network resource for data communication, resulting in signaling overload of the network.

FIG. 1 is a diagram illustrating the network architecture of an Evolved Packet Core (EPC) network to which the present invention is applied. In FIG. 1, only the entities related to the present invention are depicted among the entities constituting the EPC. The EPS may include other entities responsible for supplementary functions not dealt with herein.

Referring to FIG. 1, the User Equipment (UE) 100 denotes a terminal, and evolved Node B (eNB) 102 denotes an entity of controlling radio resource to which the UE connects through a radio channel.

The Mobility Management Entity (MME) manages the UE 100 in the idle mode and is responsible for the functions related to roaming and authentication of the UE 100. The MME 108 also processes the bearer signal generated by the UE 100.

The Home Subscriber Server (HSS) stores UE-specific subscriber information which is provided to the MME 108 for use in controlling the UE 100 when the UE 100 connects to the network.

The Serving Gateway (SGW) 104 manages user the user bearer of the UE and notifies the MME of the arrival of data addressed to the UE. The PGW 106 delivers data from a service network to the UE or from the UE to the service network. The PGW 106 has a policy for processing the data.

In the EPS, the UE establishes a radio bearer with the eNB for data communication, and the eNB and MME perform context setup and establish S1 connection therebetween.

If a predetermined condition is fulfilled after completing data communication, the MME or eNB performs eNB context release, i.e. releases the S1 connection. The eNB also performs RRC Connection Release such that the UE transitions to the idle mode.

In the case that the UE communicates small data frequently, however, the UE has to transition between the connected mode and the idle mode frequently and thus the network perform S1 connection and data bearer establishment repeatedly, resulting in increase of traffic load.

There is therefore a need of minimizing the number of state transitions of the UE and, in order to achieve this, it is effective to make the UE stay longer in the connected mode. That is, in order to process the small data occurring in the state of no other data communication, the network controls the UE to stay in the connected mode.

However, if the UE stay long in the connected mode, this is likely to cause handover overload.

DISCLOSURE OF INVENTION

Technical Problem

The present invention has been conceived to solve the above problem. The present invention aims to provide a method and apparatus for controlling handover of the UE to reduce signaling overhead when the UE is in the long connected mode.

That is, the present invention aims to reduce the handover signaling overload occurring to the UE staying in the long connected mode.

Solution to Problem

In order to solve the above problem, the network of the present invention includes a method of controlling handover of a terminal, a method of minimizing a number of handovers of the terminal, a method of transitioning, when handover is required, the terminal to the idle mode other than performing handover, and a method of minimizing handover signaling and context.

Advantageous Effects of Invention

The present invention is advantageous in terms of reducing the handover signaling overload by handling the handover efficiently especially when the UE is in the long connected mode.

MODE FOR THE INVENTION

Figure 1:
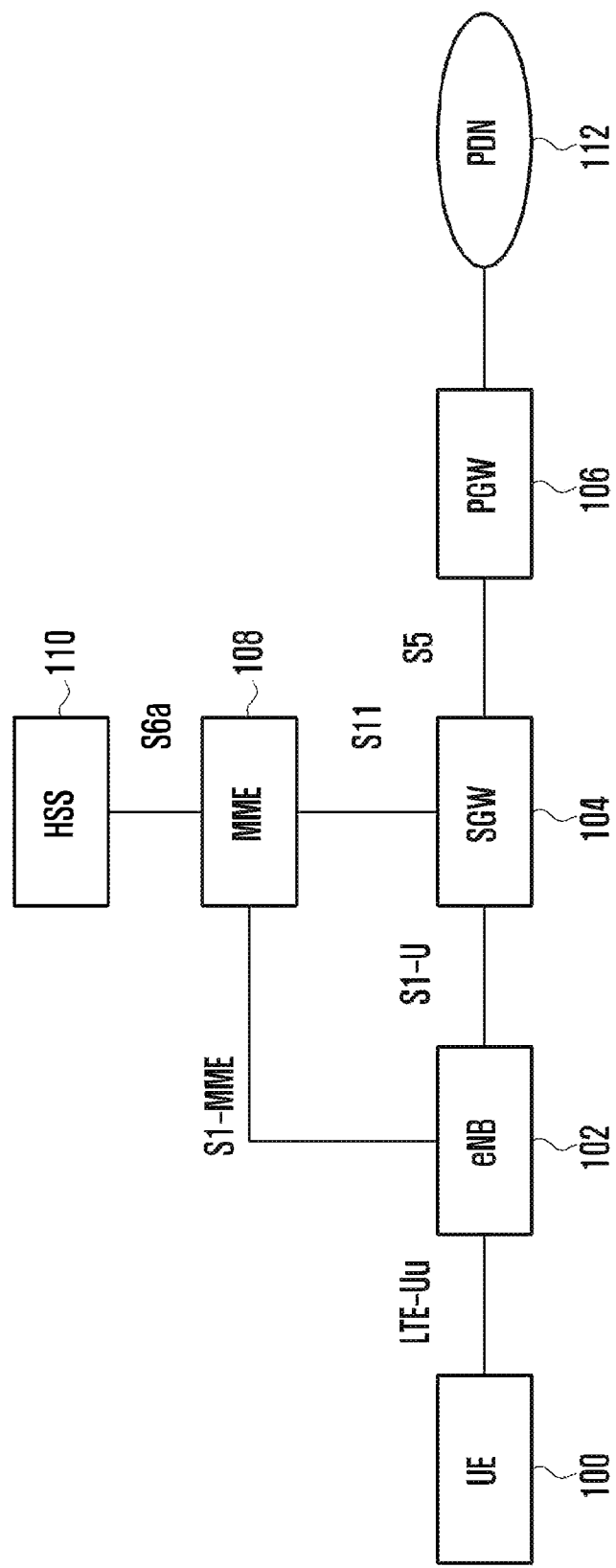
FIG. 1 is a diagram illustrating the network architecture of an Evolved Packet Core (EPC) network to which the present invention is applied.

In the following description, the term 'small data' denotes the background data such as keepalive and state transition messages that are characterized by low data rate and delay tolerance.

In the following description, the term 'long connected mode' denotes the operation mode in which the UE stays in the connected state without ongoing data.

It is obvious that the present invention is not limited to the description set forth herein, but various modifications and changes can be made thereto without departing from the broader spirit and scope of the invention. Detailed descriptions of well-known functions and structures incorporated herein may be omitted to avoid obscuring the subject matter of the present invention.

The same reference numbers are used throughout the drawings to refer to the same or like parts. In the drawings, certain elements may be exaggerated or omitted or schematically depicted for clarity of the invention. This aims to clarify the subject matter of the present invention by omitting unnecessary description of the functions not related to the present invention. Exemplary embodiments of the present invention are described herein with reference to the accompanying drawings in detail.

In order to handle the handover of the UE in the long connected mode, the present invention proposes 1) a method for the network to adjust the measurement configuration of the UE so as to be different from that of the legacy connected mode or configure the measurement report transmitted by the UE differently of the legacy connected mode processing condition, 2) a method for the network to transition the UE operation mode to the idle mode when handover is triggered, and a light handover method for transferring the least context without data forwarding process in the middle of the handover procedure.

In order for the eNB to control the UE handover according to the present invention, it is necessary to know that the UE in the long connected mode. The eNB may determine whether the UE is in the long connected mode through a) by using a specific variable or part of the subscription information which is transmitted by the MME and/or by checking whether there is data transmitted by or to the UE in the eNB.

First Embodiment

A method is provided for minimizing the number of handovers of the UE in such a way that the network adjusts the measurement configuration of the UE differently of the legacy mode or configures the measurement report sent by the UE differently of the legacy connected mode processing condition.

Figure 6:
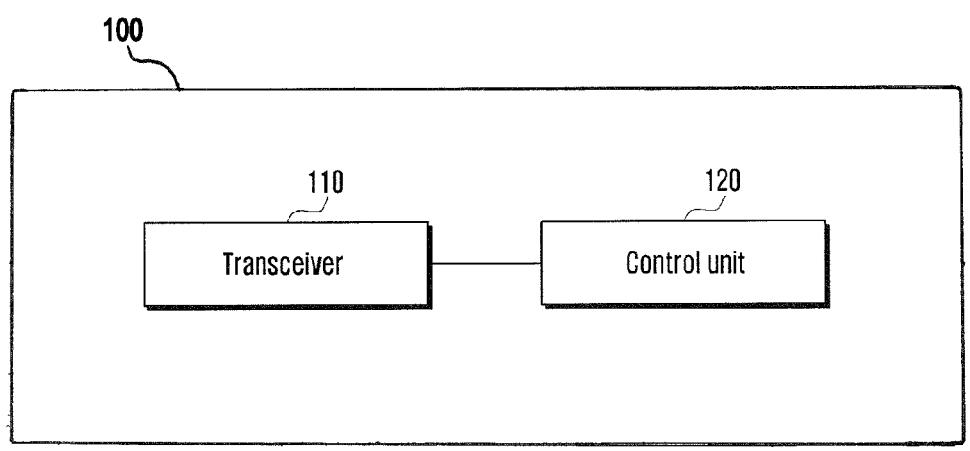
FIG. 6 is a schematic diagram of an evolved Node B (eNB) base station.

According to the first embodiment, the eNB, e.g., eNB 100 of FIG. 6, may manage the measurement configuration value of the UE in the long connected mode separately. In more detail, the eNB may send a separate channel measurement configuration via a transceiver 110 to the UE in the long connected mode through the RRC Connection Reconfiguration (RRCConnectionReconfiguration) message in the Attach or Service Request procedure.

For example, it is possible to extend the measurement report interval of the UE or decreases the threshold value of the measurement report of the UE as compared to the legacy connected mode. Such a value may be a new variable value or legacy variable value modified in the MeasConfig IE of the RRCConnectionReconfiguration message.

The eNB also may manage the measurement report processing condition for the UE in the long connected mode separately via a control unit 120, which can be implemented by using, for example, at least one hardware processor. The eNB receives a measurement report via the transceiver 110 from the UE and determines via the control unit 120 whether to trigger handover of the UE according to the processing condition. The control unit 120 may comprise, for example, at least one controller, at least one processor, or the like.

According to the measurement report processing condition, the threshold for the eNB to make a handover decision for the UE in the long connected mode is set loosely. For example, the eNB may set the threshold of the reference signal strength for handover of the UE in the long connected mode to a value less than that of the normal connected mode.

In this case, the eNB may have the measurement report processing condition for the UE in the long connected mode as described above. In this method, the UE maintains the connection to the corresponding cell even when the signal strength is lower than the signal strength threshold of the normal connected mode, thereby giving the effect of broadening the cell coverage.

Through this method, the eNB according to the first embodiment of the present invention adjusts the measurement configuration so as to minimize the number of handovers of the UE in the long connected mode.

The measurement report processing condition and measurement configuration value for the UE in the long connected mode may be fixed condition and value preset by the operator or variable condition and value set by the eNB in adaptation of the network status. The eNBs in the network may be are all configured identically or differently. All of the UEs in the long connected mode are configured identically or differently.

Figure 2:
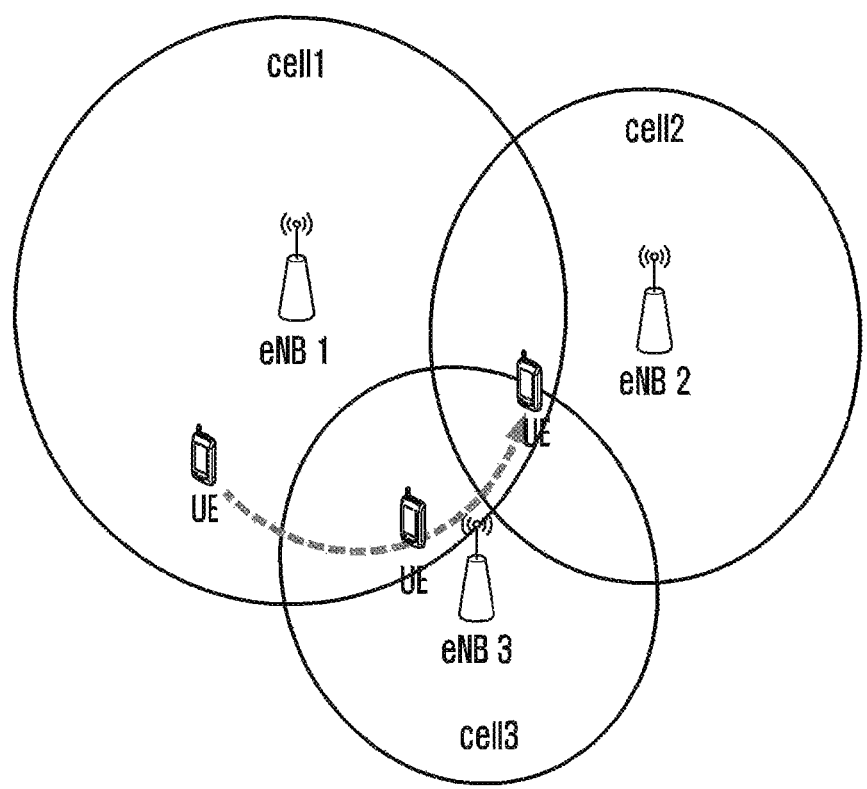
FIG. 2 is a diagram illustrating a handover situation of the UE according to an embodiment of the present invention.

FIG. 2 is a diagram illustrating a handover situation of the UE according to an embodiment of the present invention.

In the case of moving on the path as shown in the drawing, the UE in the normal connected mode is handed over from the cell 1 to the cell 2 via the cell 3 according to the handover command message from the eNB.

Meanwhile, the UE in the long connected mode proposed in the present invention maintains connection to the cell 1 on the move without handover. Since the UE in the long connected mode is in the state of operating at low data rate and/or communicating delay tolerant small data or having no ongoing data, it is possible to put up with the communication error caused by the interference from the eNB2 or eNB3.

If the UE does not fulfill the least condition for maintaining the connection to the cell 1 in the long connected mode (e.g. signal strength becomes equal to or less than the threshold value) at a certain location, the eNB makes a handover decision for the UE to the cell 2.

Second Embodiment

Method for the network to transition the UE operation mode to the idle mode when the UE handover decision is made The second embodiment proposes a method of transitioning the UE operation mode to the idle mode in the situation where the UE in the long connected mode which has no ongoing data is handed over.

The eNB analyzes the measurement report sent by the UE in the long connected mode. If the measurement result fulfils the condition of triggering handover of the UE, the eNB transmits the UE operation state to the idle mode by triggering the S1 release procedure other than making any handover decision for the UE. The handover condition may correspond to the configuration for the UE in the long connected mode as described in section 1).

Figure 3:
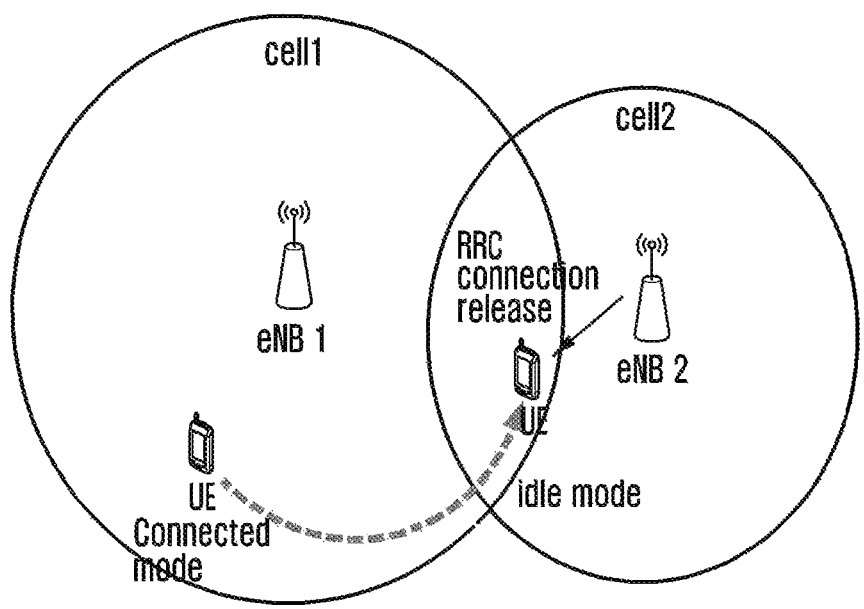
FIG. 3 is a diagram illustrating a handover situation of the UE according to another embodiment of the present invention.

FIG. 3 is a diagram illustrating a handover situation of the UE according to another embodiment of the present invention.

In the case of moving on the path as shown in the drawing, the UE in the normal connected mode is handed over from the cell 1 to the cell 2 according to the handover command message from the eNB 1.

In the case of the UE in the long connected mode proposed by the present invention, if the measurement report transmitted by the UE fulfils the condition for handover of the UE, the eNB 1 triggers the S1 release procedure other than making a handover decision for the UE to the cell 2. That is, the eNB 1 transmits the RRC Connection Release message to the UE.

Meanwhile, the configuration for the UE in the long connected mode proposed in the first embodiment may be applied to the second embodiment. The UE in the long connected mode according to the first embodiment maintains the connection to the current cell unlike the UE in the normal connected mode which performs handover in such a situation.

If the UE does not fulfill the least condition for maintaining the connection to the current cell in the long connected mode (e.g. signal strength becomes equal to or less than the threshold value) at a certain location, the eNB may release the S1 connection for the UE.

Through this method, it is possible to reduce the number of transitions to the idle mode as compared to the case operating in the normal connected mode.

Third Embodiment

Light handover method for handover of the least context without data forwarding process in the middle of handover procedure According to the third embodiment, when the UE in the long connected mode performs handover in the situation without ongoing data, the network operates without data forwarding process during the legacy handover procedure. In this way, it is possible to reduce handover signaling overhead.

Figure 4A:
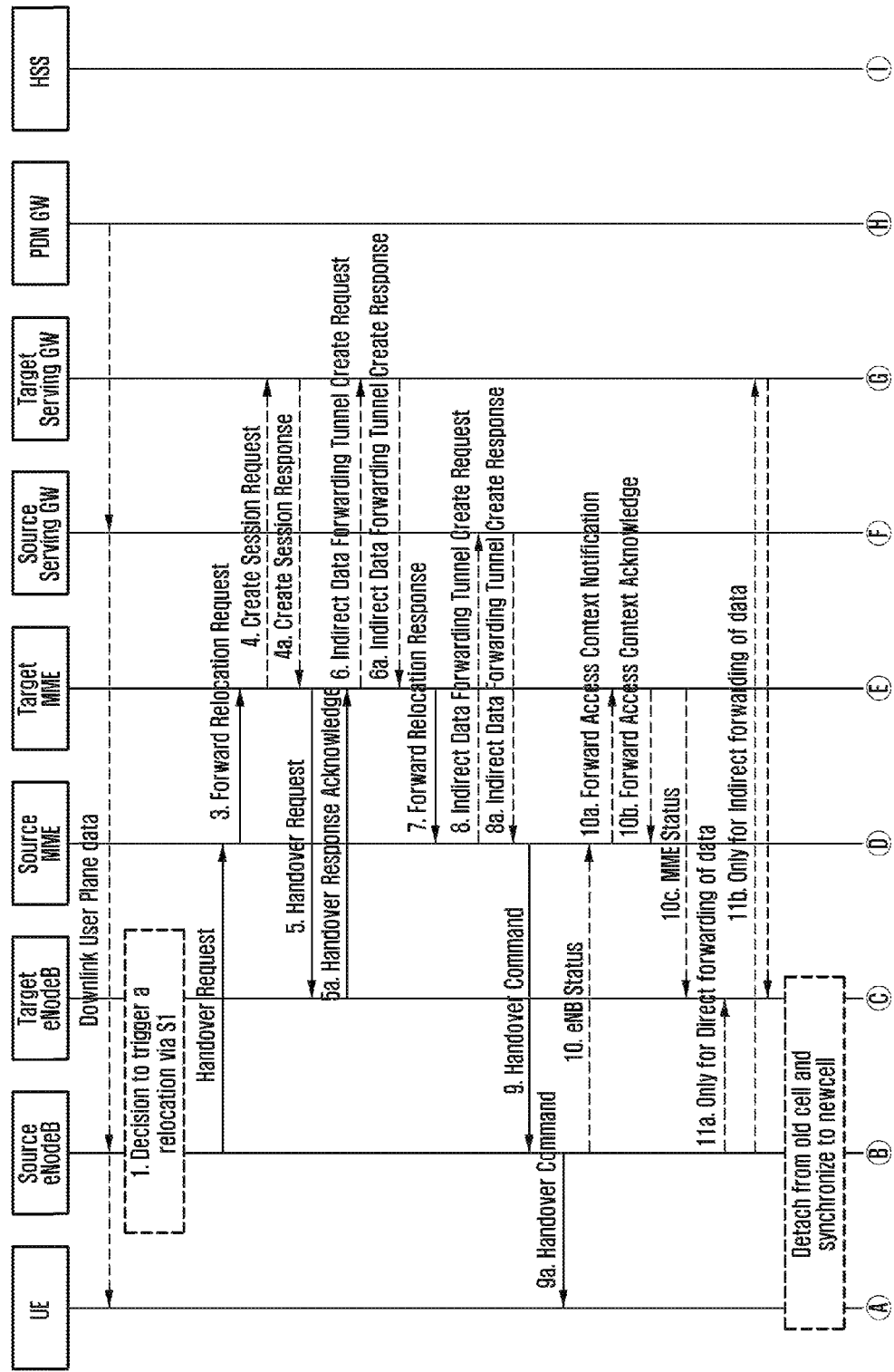
FIG. 4 is a signal flow diagram illustrating the conventional UE's S1 handover procedure.
Figure 4B:
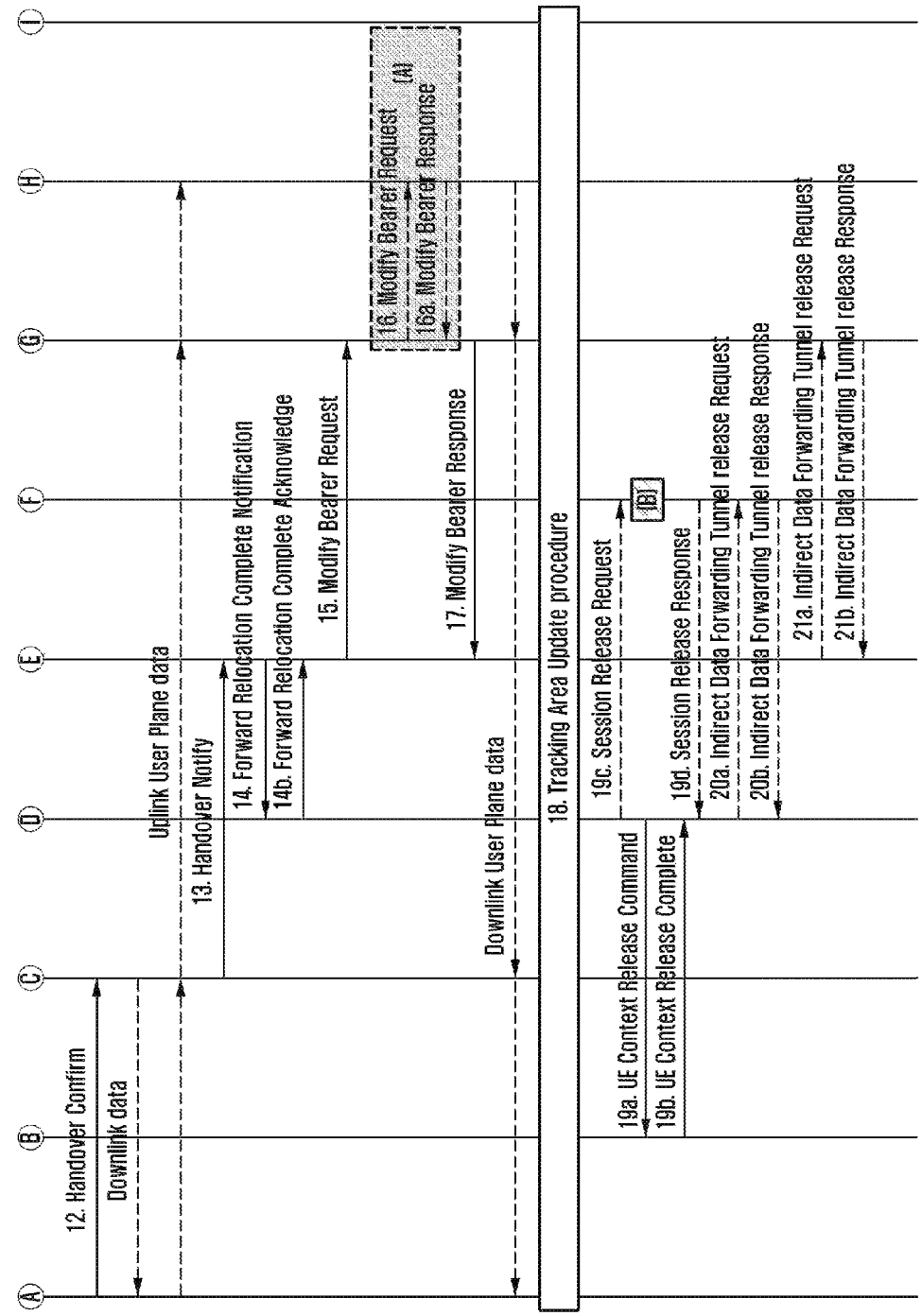

FIG. 4 shows a S1 handover procedure of the UE in the normal connected mode. Briefly, the eNB makes a handover decision for the UE and notifies the source MME of this, and the source MME sends the target MME a request for data forwarding. The source and target MMEs perform data forwarding in cooperation with the source and target SGWs. This means that the data forwarding occupies large part of the handover procedure.

Figure 5:
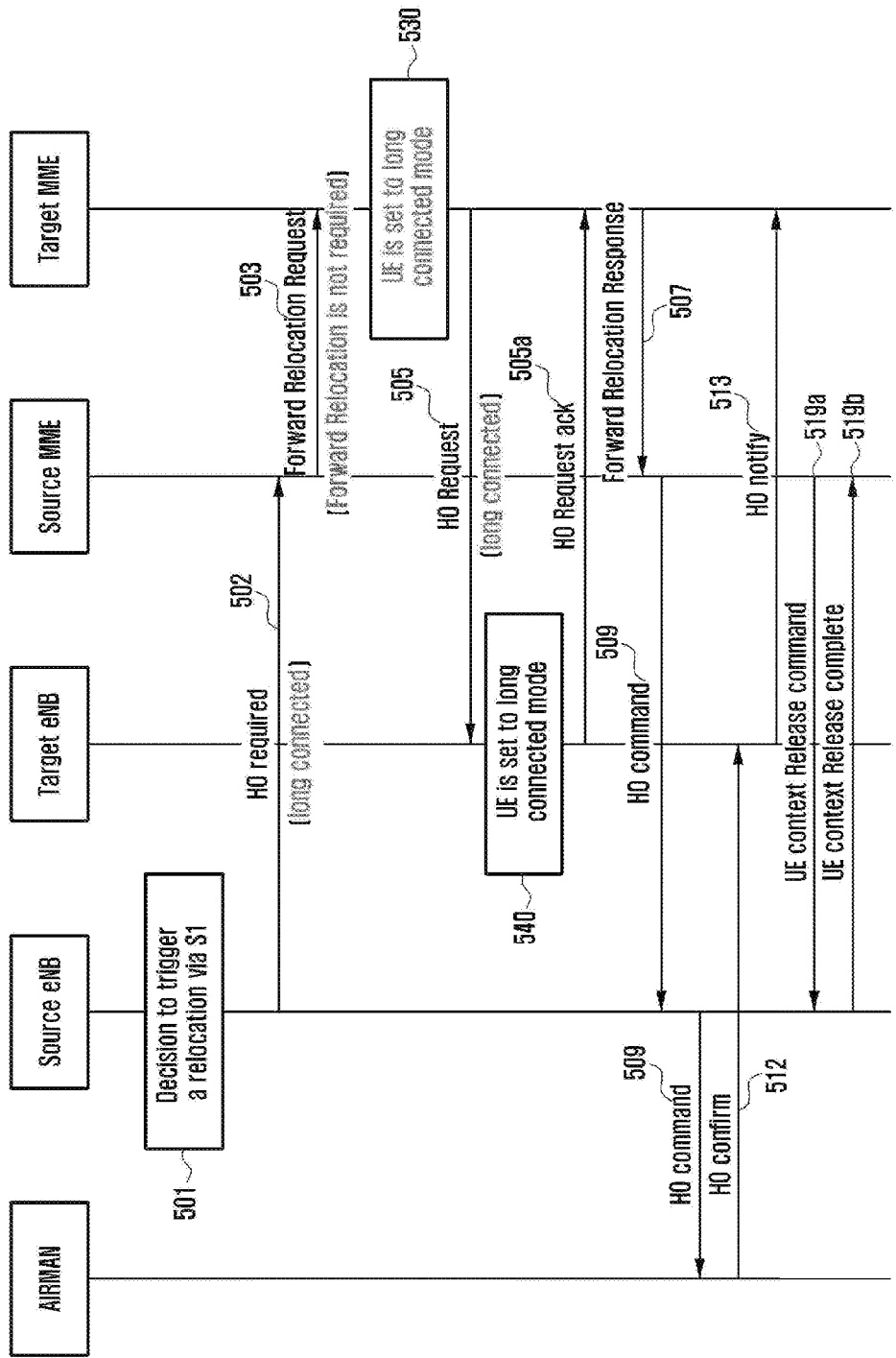
FIG. 5 is a signal flow diagram illustrating the handover procedure according to the third embodiment of the present invention.

FIG. 5 is a signal flow diagram illustrating S1 handover of the UE according to an embodiment of the present invention.

1. The source eNB makes a handover decision for the UE. The source eNB knows that the UE is in the long connected mode and has no ongoing data. (step 501)

2. The source eNB sends the source MME a HO required message. The HO required message may include or not the information indicating that the UE is in the long connected mode depending on the method of checking whether the UE is in the long connected mode. (step 502)

3. The source MME sends the target MME the Forward Relocation Request message to notify of no necessity of data forwarding process. This information may be carried by a new parameter or a modified value of a legacy parameter in the Forward Relocation Request message. The information "Forward Relocation is not required" as shown in FIG. 4 is applicable to both the above methods. (step 503

4. The target MME stores the information that the corresponding UE is not in the long connected mode if necessary. The information that the UE is in the long connected mode may be used as a condition for determining that the omission of data bearer-related parameter in the UE context managed by the MME is not error. The target MME also may omit the data bearer-related parameter and sends the eNB the HO request message. (step 530)

5. The target MME sends the target eNB the HO request message including the information indicating that the UE is not in the long connected mode. This information may be carried by a new parameter or a modified value of a legacy parameter in the HO request message. The information "long connected" as shown in FIG. 4 is applicable to both the above methods. (step 505)

6. The target eNB store the information that the corresponding UE is not in the long connected mode if necessary. (step 540)

7. The subsequent procedure follows the standard procedure.

According to another embodiment, the target eNB may acquire the information that the corresponding UE is not in the long connected mode from a transparent container transmitted from the source eNB to the target eNB. The source eNB transmits the information that the corresponding UE is in the long connected mode using the transparent container which is delivered to the target eNB via the source and target MMEs as shown in FIG. 4.

The invention claimed is:

1. A method for controlling handover of a terminal by a base station, the method comprising:
   identifying whether the terminal is in a first connected mode or a second connected mode;
   transmitting, if the terminal is in the first connected mode, to the terminal channel measurement configuration information with a first channel measurement report trigger condition; and
   transmitting if the terminal is in the second connected mode, to the terminal the channel measurement configuration information with a second channel measurement report trigger condition.

2. The method of claim 1, wherein the terminal is a connected state with ongoing data in the first connected mode, and the terminal is the connected state without ongoing data in the second connected mode.

3. The method of claim 1, wherein each of the first and the second channel measurement report trigger condition includes at least one of a channel measurement report trigger interval or a signal strength threshold value.

4. The method of claim 3, wherein the channel measurement report trigger interval of the second channel measurement report trigger condition is longer than the channel measurement report trigger interval of the first channel measurement report trigger condition.

5. The method of claim 3, wherein the signal strength threshold value of the second channel measurement report trigger condition is lower than the signal strength threshold value of the first channel measurement report trigger condition.

6. The method of claim 1, further comprising:
receiving from the terminal a measurement report based on the channel measurement configuration information;
if the terminal is in the first connected mode, determining whether to control handover of the terminal based on a first measurement report processing condition, and
if the terminal is in the second connected mode, determining whether to control handover of the terminal based on a second measurement report processing condition.

7. The method of claim 6,
wherein each of the first and the second measurement report processing condition includes a signal strength threshold value, and
wherein the signal strength threshold value of the second measurement report processing condition is lower than the signal strength threshold value of the first measurement report processing condition.

8. A base station for controlling handover of a terminal, the base station comprising:
a transceiver configured to transmit and receive a signal to and from the terminal; and
a processor configured to:
identify whether the terminal is in a first connected mode or a second connected mode;
if the terminal is in the first connected mode, transmit to the terminal channel measurement configuration information with a first channel measurement report trigger condition; and
if the terminal is in the second connected mode, transmit to the terminal the channel measurement configuration information with a second channel measurement report trigger condition.

9. The base station of claim 8, wherein the terminal is a connected state with ongoing data in the first connected mode, and the terminal is the connected state without ongoing data in the second connected mode.

10. The base station of claim 8, wherein each of the first and the second channel measurement report trigger condition includes at least one of a channel measurement report trigger interval or a signal strength threshold value.

11. The base station of claim 10, wherein the channel measurement report trigger interval of the second channel measurement report trigger condition is longer than the channel measurement report trigger interval of the first channel measurement report trigger condition.

12. The base station of claim 10, wherein the signal strength threshold value of the second channel measurement report trigger condition is lower than the signal strength threshold value of the first channel measurement report trigger condition.

13. The base station of claim 8, wherein the processor is further configured to:
receive from the terminal a measurement report based on the channel measurement configuration information;
if the terminal is in the first connected mode, determine whether to control handover of the terminal based on a first measurement report processing condition; and
if the terminal is in the second connected mode, determine whether to control handover of the terminal based on a second measurement report processing condition.

14. The base station of claim 13,
wherein each of the first and the second measurement report processing condition includes a signal strength threshold value, and
wherein the signal strength threshold value of the second measurement report processing condition is lower than the signal strength threshold value of the first measurement report processing condition.

* * * * *